United States Patent Office

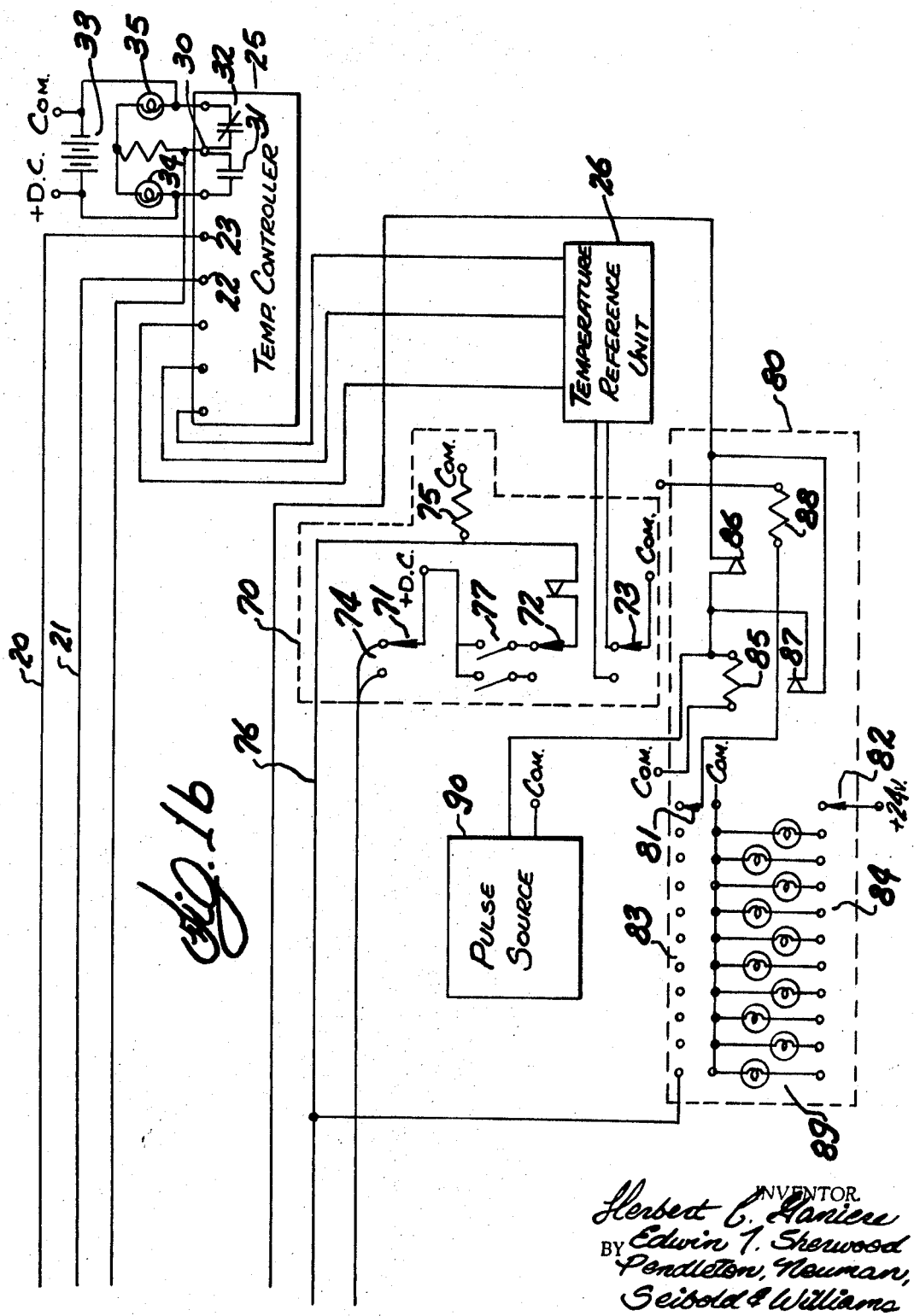

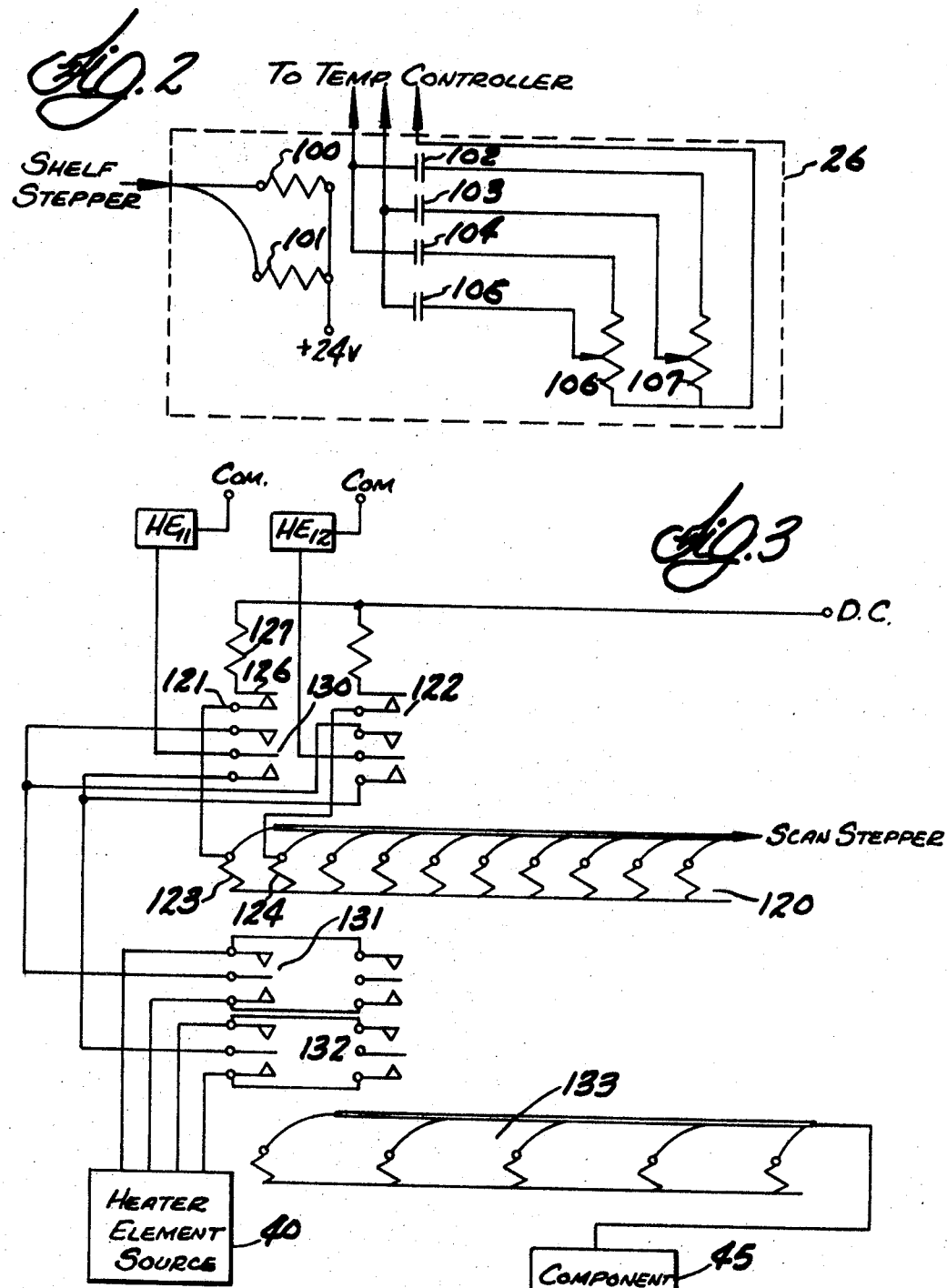

3,470,356
Patented Sept. 30, 1969

3,470,356
MULTIPLE TEMPERATURE CONTROLLER
Herbert Carl Ganiere and Edwin Theodore Sherwood, Milwaukee, Wis., assignors to Globe-Union Inc., Milwaukee, Wis., a corporation of Delaware
Filed July 18, 1966, Ser. No. 566,155
Int. Cl. H05b 3/02
U.S. Cl. 219—508                4 Claims

ABSTRACT OF THE DISCLOSURE

A multiple temperature controller is described where the temperatures at various locations of a testing oven are controlled with one temperature controller and a switching system. The switching system enables different temperature references to be applied to different locations and also permits different levels of electrical power to be supplied to different locations depending on whether the components at the locations are being tested under operating conditions.

---

This invention relates to temperature control systems and particularly to a novel multiple temperature control system for controlling temperatures at a plurality of locations.

It is frequently necessary to provide individual temperature control for a plurality of locations. For example, in environmental testing of electrical components a plurality of components may be placed at different locations in a testing oven and the temperature at each location individually controlled. Where accurate temperature control must be maintained, it is a usual practice to employ a temperature controller such as a resistance bridge controller. It is neither economical nor practicable to use an individual temperature controller for each location where a large number of locations require control.

It is, therefore, an object of the present invention to provide a novel temperature control system for controlling temperature at a plurality of locations.

It is a further object of the present invention to provide a system for enabling a temperature control device to be time-shared by a plurality of locations.

These and other objects are accomplished by providing individual heating elements and individual temperature sensing elements at each of a plurality of locations where the temperature is to be controlled. A switching system, constructed according to the present invention, is employed to sequentially connect the individual temperature sensing elements to a master temperature controller and, at the same time, connect the corresponding heating elements to a source of power. The power delivered to the heating elements is regulated by the master temperature controller in accordance with comparisons made by the controller between the temperatures sensed at the various locations and the desired temperatures.

In a preferred embodiment of the present invention the switching system employs a plurality of stepping relays. The plurality of locations to be temperature controlled are classified according to the temperature which is to be maintained at the locations. Stepping relays are associated with each class to sequentially select different ones of the sensing and heating elements for connection to the temperature controller. Another stepping relay is provided to sequentially select the particular class which is to be controlled at the particular instant. This relay performs the additional function of selecting one of a plurality of temperature references for the class. The temperature reference and the temperature sensed in each location of the class are compared in the master control unit which provides appropriate control for the heating elements.

A more detailed description of the present invention will be given with reference to the accompanying drawings in which:

FIGS. 2 and 3 are schematic diagrams of two elements shown in block form in FIG. 1.

Figure 1A:
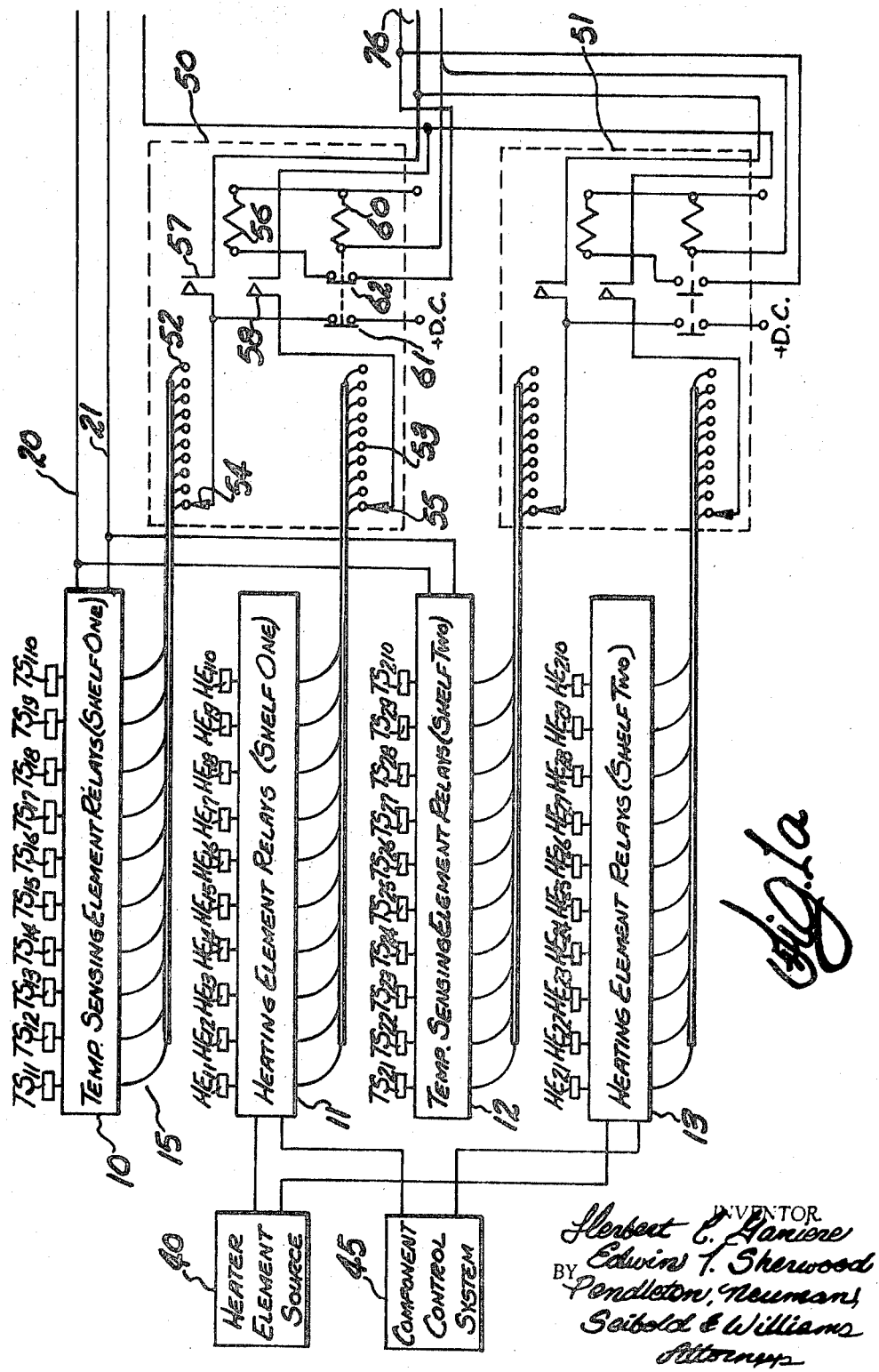
FIG. 1 is a two part (FIGS. 1a and 1b) overall system diagram, partially in block form and partially schematic, of a temperature control system constructed according to the present invention.

The temperature control system shown in FIG. 1 is designed to sequentially provide individual temperature control for a plurality of locations. For example, the system may be used in conjunction with an electrical component testing oven such as that described in co-pending U.S. patent application, Ser. No. 488,413, assigned to the assignee of the present application. The oven described in the co-pending application includes a plurality of testing cells in which electrical components may be tested. The temperature is individually controlled in each cell.

Each of the locations or cells to be temperature controlled has both a conventional temperature sensing element, $TS_{ab}$, such as a thermistor and a conventional heating element $HE_{ab}$. The sensing and heating elements are controlled by a plurality of relay banks, 10, 11, 12, 13. For the sake of simplicity, the individual relays are not shown in FIG. 1. The relays 10, 12 for the temperature sensors connect one of the sensors to two output lines 20, 21. The heating element relays are described in detail with reference to FIG. 3. While the temperature sensing and heating elements are illustrated in proximity to their associated relay banks it should be noted that the elements are located in the respective cells or locations under control.

The sensing and heating elements are separated into two shelves. The temperatures to be maintaned at the locations of one shelf are the same, while the temperatures for locations in different shelves are in general different. While only two shelves have been shown it should be understood that any number may be employed.

Depending upon which of the relays of the relay bank 10 is closed, one of the temperature sensors $TS_{ab}$ is connected via two lines 20, 21 to the input terminals 22, 23 of a temperature controller 25 (FIG. 1b). The temperature control unit 25 is a standard piece of electrical equipment and may, for example, be a Honeywell R7082 Temperature Controller. It performs the functions of comparing the resistance of the temperature sensing element $TS_{ab}$ with a reference resistance obtained from a temperature reference unit 26, and generating a signal indicative of the comparison. If the temperature sensed by the temperature sensor is greater than that indicated by the reference, then the voltage at the output terminal 30 of the temperature controller 25 is zero. On the other hand, if the temperature sensed by the temperature sensor is lower than that indicated by the temperature reference control, then the output of the temperature controller is a positive voltage. The particular voltage which appears at the output terminal 30 is controlled by two internal switches 31, 32 only one of which is closed at any one time. The two switches provide connection between a D.C. supply source 33 and the output terminal 30 of the controller 25. Two lamps 34, 35 are provided to indicate the condition of the controller output.

Referring again to FIG. 1a, the heating elements $HE_{ab}$ receive power through the relays 11, 13 from a heater element source 40 which is described in more detail below. The amount of power delivered by the power source 40 to a particular heating element depends upon the condition of the output of the temperature controller 25 and on the component control system 45.

The component control system 45 is provided where electrical components are being tested. It controls the power supplied to the various electrical components at the various locations. If a component is being tested under operating conditions and is therefore receiving power, then the component itself generates heat. Therefore, less power is supplied to the particular heater element from the source 40 to bring that particular location to the proper temperature than would be supplied if the component were not receiving power. Component control systems such as the system 45 are well known to the art.

Each of the two shelves has an associated scan-stepper relay 50, 51 to sequentially control both the temperature-sensing elements $TS_{ab}$ and the heating elements $HE_{ab}$ at the various locations in the shelf. Both scan-steppers 50, 51 are identical and only the first 50 will be described in detail. The scan-steppers 50, 51 may be, for example, conventional rotary stepping switches with two sets of ten contacts 52, 53 and corresponding wiper arms 54, 55 which sequentially make contact with the two sets of contacts 52, 53.

The first set of contacts 52 of the scan-stepper 50 are connected to corresponding temperature-sensing element relays contained in the relay bank 10. When an energizing voltage is applied from the wiper arm 54 through one of the contacts 52 to a corresponding relay in the bank 10, then that relay is energized and the corresponding temperature sensor $TS_{ab}$ is connected to the two lines 20, 21.

The second set of contacts 53 is provided for the heating element relay bank 11 of shelf one. When the wiper arm 55 is connected to a contact 53 the corresponding heater element relay is opened or closed depending on the voltage present at the wiper arm 55.

The two wiper arms 54, 55 are operated by a coil 56 which is an integral part of the scan-stepper 50. The coil 56 also operates a switch 57 which closes at the tenth step of the scan-stepper 50. The switch 57 may be a second contact at the tenth position of the arm 54. A second switch 58 is also operated by this coil and is closed each time the coil is operated.

A second coil 60 is also contained within the scan-stepper 50. This coil 60 operates two switches 61, 62 both of which are open when the second coil 60 is not energized and closed when the coil 60 is energized. The first 61 of these two switches, in its closed position, connects the D.C. source 33 through the wiper arm 54 to one of the sensing relays 10. The second of the switches 62, in its closed position, connects a source of pulses to the first coil 56 to step the wiper arms. The common ends of the two coils 56, 60 are connected to the common or return path terminal of the D.C. source 33, of the two coils.

The wiper arm 54 for the temperature-sensing element relays 10 is connected through the switch 57 to a shelf-stepping relay 70, (FIG. 1b). The corresponding wiper arm in the second scan-stepper 51 is also connected through a similar switch, to the shelf-stepping relay 70.

The coil 75 which operates the shelf-stepping relay 70 is supplied power from the scan-stepping relays 50, 51 over the lead 76. Power is supplied to the coil 75 when either of the scan-steppers 50, 51 reaches the tenth step. When that condition occurs the tenth step switch 57 of the scan-stepper is closed and the D.C. source is connected to the energizing lead 76.

The shelf-stepping relay 70 includes three movable wiper arms 71, 72, 73 operated by the coil 75. The first 71 is associated with a first plurality, here two, of contacts 74, one for each scan-stepper, and connects the D.C. source 33 through the particular one of the contacts 74 to which it is connected to the second coil 60 contained in the corresponding scan-stepper.

In order to provide means for skipping an entire shelf a plurality of switches 77 are provided for connecting the D.C. source 33 to the coil 75 of the shelf-stepper 70. When one of these switches 77 is closed, then as soon as the second wiper arm 72 reaches that shelf position, the D.C. source 33 is connected to the coil 75 and the scan-stepper will switch back to the other shelf.

The third wiper arm 73 of the shelf-stepping relay 70 provides control for the temperature reference unit 26. The details of this unit are described below in detail with reference to FIG. 2. As was noted earlier the temperatures to be set at the various locations in any particular shelf are the same for all the locations. However, the temperature may vary from shelf-to-shelf. Therefore, the third wiper arm 73 is employed to control the selection of the particular temperature reference which is to be used to control the temperature of the particular shelf.

A third stepping-switch 80 is provided in the scanning system for synchronizing purposes. The synchronizing stepper 80 has two wiper arms 81, 82, and each has a plurality of associate contacts 83, 84. The number of contacts 83, 84 associated with the wiper arms 81, 82 is one greater than the number of locations contained in any particular shelf. Since each of the two shelves contains ten locations, then each set of contacts 82, 83 includes eleven contacts.

The coil 85 which operates the two wiper arms 81, 82 is energized by a pulse source 90, which is a standard pulse generator. The pulse source 90 supplies pulses to the synchronizing stepper at the rate at which the locations in a particular shelf are to be scanned. This might, for example, be one pulse per second.

The pulse source 90 is also connected through two parallel switches 86, 87 to supply energy to the coils 56 of the scan-steppers 50, 51. Thus, power is supplied to the scan-steppers 50, 51 if either of the two switches 86, 87 is closed. The first of these switches 86 is a switch which opens only when the synchronizing stepper reaches step number 11. The second switch 87 is operated by a second coil 88 contained within the synchronizing stepper 80. The second coil 88 is energized only when two conditions occur, one of the scan-steppers 50, 51 is at step number 10 and the sync-stepper wiper arm 81 is at step number 11. Therefore, when the sync-stepper reaches step 11 at the same time the scan-stepper reaches step 10, then no pulses are supplied to the scan-stepper until the sync-stepper advances one more step. From then on the scan-steppers 50, 51 run in synchronism with the sync-stepper 80.

The second wiper arm 82 energizes one of a plurality of lamps 89 to indicate which location within a shelf is being controlled.

FIG. 2 is a schematic diagram of the temperature reference unit 26 shown in block form in FIG. 1. The temperature reference unit 26 contains two coils 100, 101 which are energized by signals from the shelf stepper 70. The first 100 operates a first pair of switches 102, 103, and the second a second pair 104, 105. The switches are connected respectively to two potentiometers 106, 107 which set the reference temperature for the two shelves. Thus, three of the contacts from one of the two potentiometers 106, 107 are connected to the master temperature controller 25. The particular one of the potentiometers 106, 107 which is connected to the temperature controller depends on which of the switches 102, 103, 104, 105 associated with the coils 100, 101 are closed.

FIG. 3 is a schematic diagram of the heating element relay banks 11 shown in block form in FIG. 1. Each of ten coils 120 of the bank operates two switches. Only two sets of switches 121, 122 are shown for the sake of simplicity. These two sets of switches 121, 122 are controlled respectively by the first two relay coils 123, 124. Each of the sets 121, 122 has two switches, one 126 a single pole single throw and the other 130 a single pole double throw. The first switch 126 of the first set connects the relay coil 123 to the D.C. source 33 through a resistor 127. This switch 126 is closed when the coil 123 is energized by a signal from the scan-stepper 50. After the switch 126 is thus closed, the coil 123 remains energized due to the voltage applied through the resistor 127 until de-energized by a zero volt signal from the scan-stepper.

The heating element $HE_{11}$ is connected to the center pole of the spot switch 130, the other two poles of which are connected to the center points of second switches 131, 132. The other four terminals of the second switches 130, 131 are connected to the heater element source 40 which supplies one of four voltages to the heater elements depending on the particular positions of the switches. The four voltages correspond to four different conditions of operation of the heater. The particular values of the four voltages will of course depend on the application of the system.

The second relay bank 133 includes five coils which control the second set of switches. These are controlled by the component control system 45. The function of the component control system 45 is to control the power supplied to the electrical components undergoing tests at the various locations and to regulate accordingly the power supplied to the various heating elements. If a component under test is being supplied power, it will generate heat of its own and therefore a lesser amount of heat need be supplied to the location via the heating element. Therefore, when the components in the various locations are being supplied power the switches are in a position so that a lower voltage is supplied to heater elements. In the embodiment shown one component control relay 138 controls two locations. Thus the components in these two locations are both either receiving or not receiving power. The particulars of component control systems are well known and form no part of the present invention.

In the operation of the illustrated embodiment of the present invention, one of the plurality of temperature-sensing elements $TS_{ab}$ is connected at any one time to the terminals of the temperature controller 25. A comparison is made by the controller 25 between the resistance indicated by the temperature-sensing element and the reference resistance set by the corresponding potentiometer contained within the temperature reference control unit 26. In the condition of the system indicated in FIG. 1, the temperature-sensing element $TS_{11}$ is connected to the temperature controller 25 due to the scan-stepper wiper arm 54 forming a connection between the relay controlling the temperature-sensing element $TS_{11}$ and the D.C. source 33 through the switch 61.

Correspondingly, the second wiper arm 55 of the scan-stepper 50 connects the heating element relay associated with heating element $HE_{11}$ to the output terminal 30 of the temperature controller 25. Thus, both the temperature-sensing element $TS_{11}$ and the heating element $HE_{11}$ are under the control of temperature controller 25.

The temperature controller 25 compares the resistance indicated by the temperature-sensing element $TS_{11}$ with the resistance set in the temperature reference control unit 26. If the temperature sensed by the temperature-sensing element $TS_{11}$ is greater than that indicated by the temperature reference control unit 26, then the output of the temperature controller 25 is zero volts and this zero volt signal is supplied to the relay controlling the corresponding heating element $HE_{11}$. When the heating element relay receives the signal it connects the heating element $HE_{11}$ to the lowest voltage of the source 40. This will generally be zero volts. If on the other hand, the temperature indicated by the temperature-sensing $TS_{11}$ is lower than that indicated by the temperature reference control unit 26, then the temperature controller 25 will produce a positive voltage at its output and this will be supplied to the heating element relay. This positive voltage causes the relay to close thereby connecting the heating element $HE_{11}$ to a higher voltage level of the source 40.

A short time after the comparison is made in the temperature controller 25 and the heating element relay is correspondingly controlled, a pulse will be generated by the pulse generator 90 and applied to the synchronizing stepper coil 85. This pulse will be coupled through the switches 86, 87 in the synchronizing stepper 80 through the closed switch 62 in the scan-stepper 50 to the coil 56 which operates the scan-stepper 50. The scan-stepper 50 will advance one position and connect the next temperature-sensing element $TS_{12}$ and the next heater element $HE_{12}$ to the temperature controller 25. The comparison process will be repeated in the temperature controller and after the heating element $HE_{12}$ is appropriately controlled, another pulse will be generated by the pulse generator 90 and again the scan-stepper 50 will be advanced to the next position. When the scan-stepper 50 is advanced to the tenth position then the switch 57 in scan-stepper 50 is closed and the D.C. source 33 is connected through the switch 61 to the control coil 75 of the shelf-stepper 70. The shelf-stepper 70 then advances one position. With the shelf-stepper 70 in the next position, shelf number two is scanned in the same manner as shelf number one. When shelf number two has been completely scanned, i.e., when heater element $HE_{210}$ is appropriately controlled, then the process is started all over again.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

What is claimed is:

1. A system for controlling temperature at a plurality of locations, some of which contain electrical components receiving electrical power, each of said locations including a temperature sensing element providing an indication of the temperature at said location and a heating element, said system comprising:
   (a) means for generating a plurality of temperature references,
   (b) means for comparing one of said temperature references with the temperature indication produced by one of said temperature sensing elements and for providing a signal indicative of the comparison,
   (c) power supply means for supplying a first level of power to the heater elements in locations without electrical components receiving power and a lower level of power to the heater elements in locations with electrical components receiving power,
   (d) a first plurality of switching means each for sequentially connecting the temperature sensing elements at respective groups of locations to said comparing means upon being energized by an energizing signal, each of said groups including locations to be maintained at the same temperature,
   (e) a second plurality of switching means for sequentially controlling the heater elements at said respective groups of locations, in accordance with said signal produced by said comparing means, upon being energized by said energizing signal,
   (f) third switching means for sequentially supplying said energizing signal to said first and second plurality of switching means.

2. A system for controlling temperature as claimed in claim 1 wherein each of said second plurality of switching means comprises a stepping relay and a group of relays, each relay of said group including a coil and two switches, the first switch providing a connection between a source of electrical energy and said coil when said switch is closed, said second switch determining which of said levels of power is delivered to said heater elements.

3. A system for controlling temperature as claimed in claim 1 wherein said third switching means also sequentially connects said temperature references to said comparing means.

4. A system for controlling temperature as claimed in claim 1 and further including means for synchronizing the operation of said first and second plurality of switching means.

References Cited

UNITED STATES PATENTS

| | | | |
|---|---|---|---|
| 2,843,714 | 7/1958 | Stanton | 219—497 |
| 3,166,246 | 1/1965 | Fielden | 219—499 |
| 3,247,361 | 4/1966 | Woodley | 219—497 |

FOREIGN PATENTS 1,333,375  6/1963  France.

BERNARD A. GILHEANY, Primary Examiner

F. E. BELL, Assistant Examiner